A. E. BURNSIDE.
AUTOMOBILE JACK.
APPLICATION FILED SEPT. 27, 1920.
1,392,297.
Patented Oct. 4, 1921.
4 SHEETS—SHEET 1.
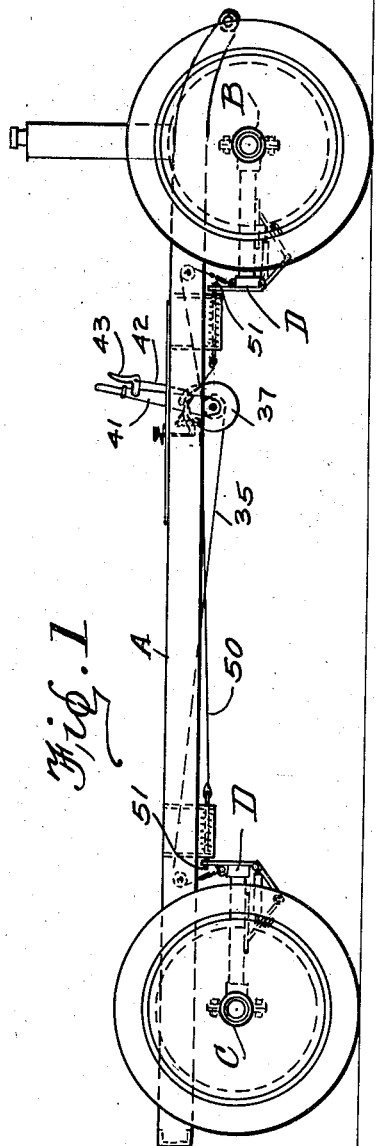
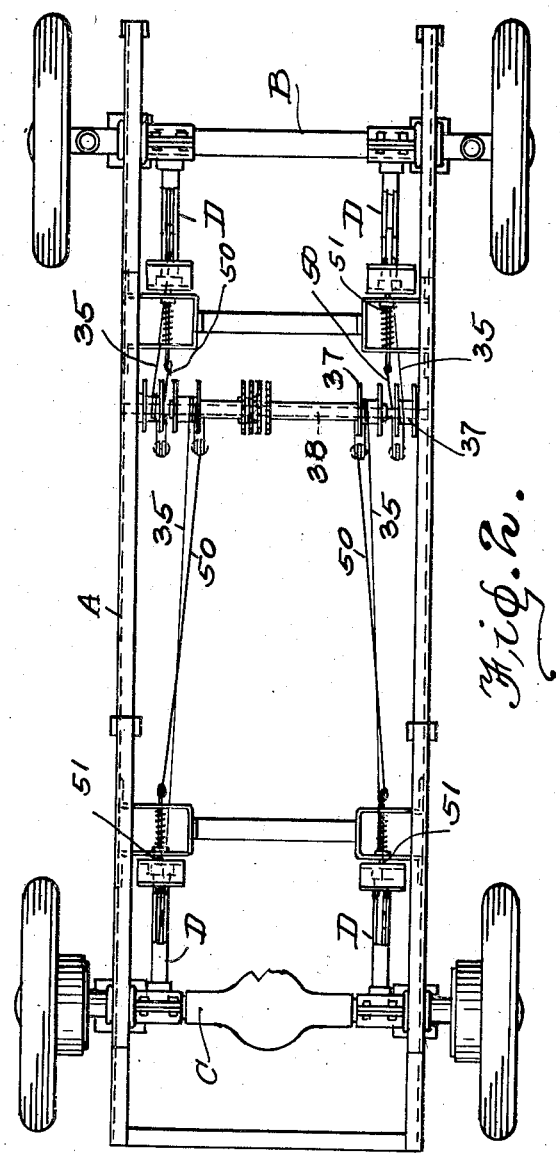
A. E. BURNSIDE
INVENTOR
BY *Victor J. Evans*
ATTORNEY

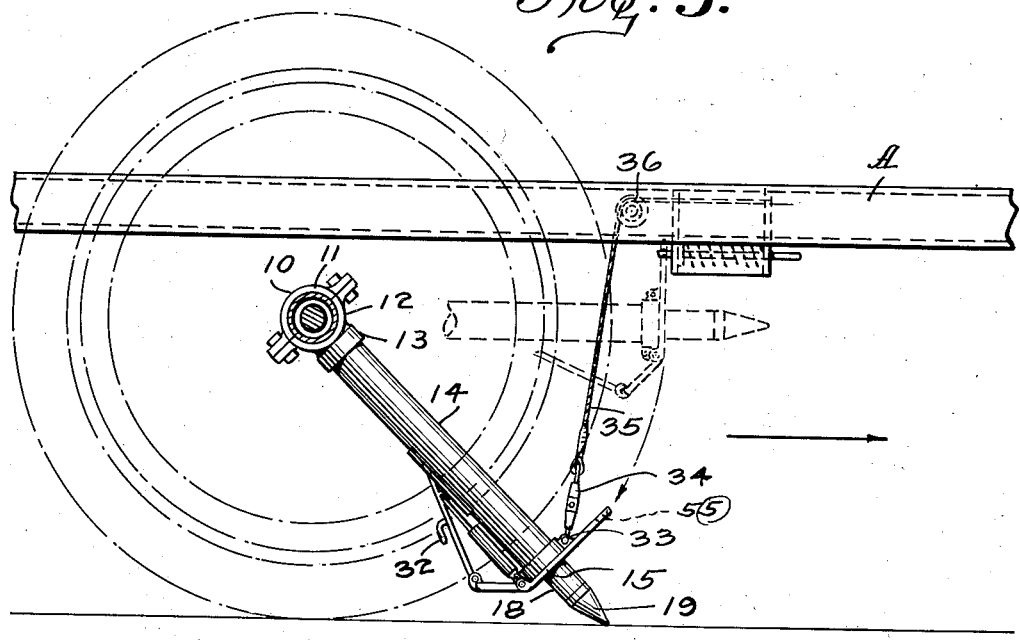
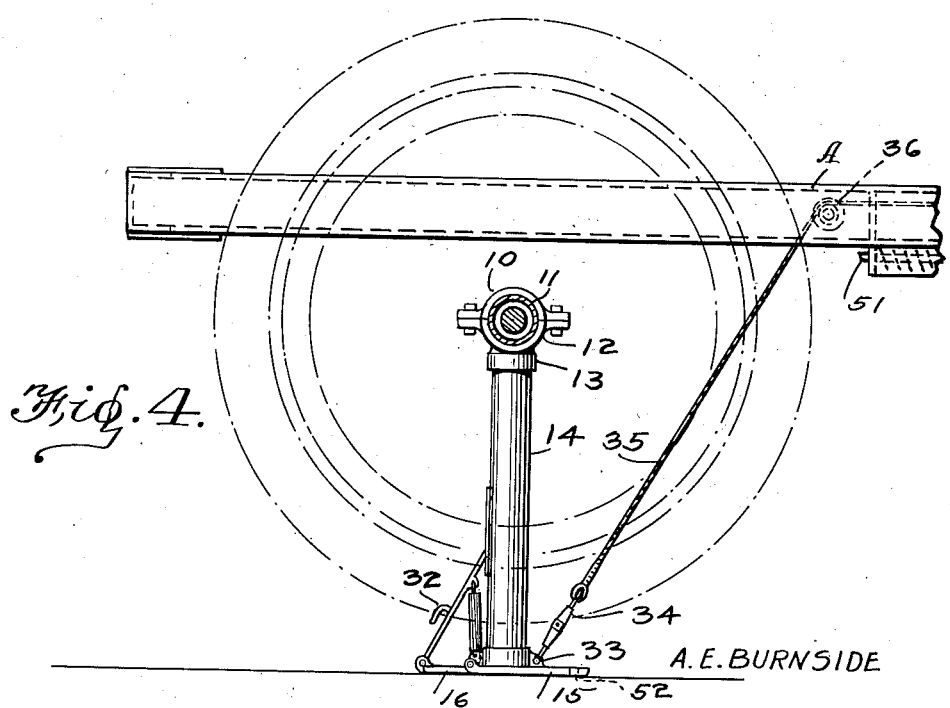

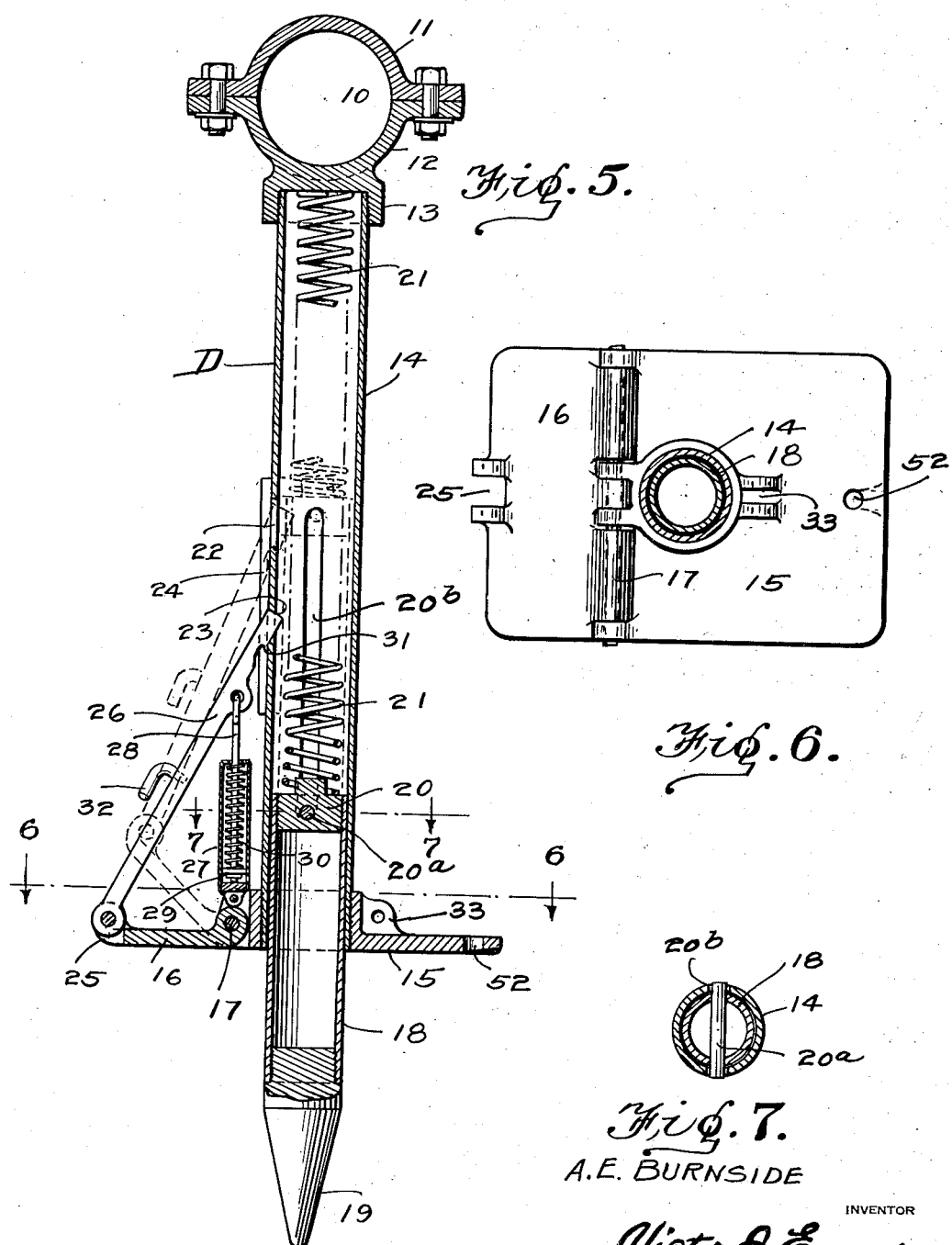

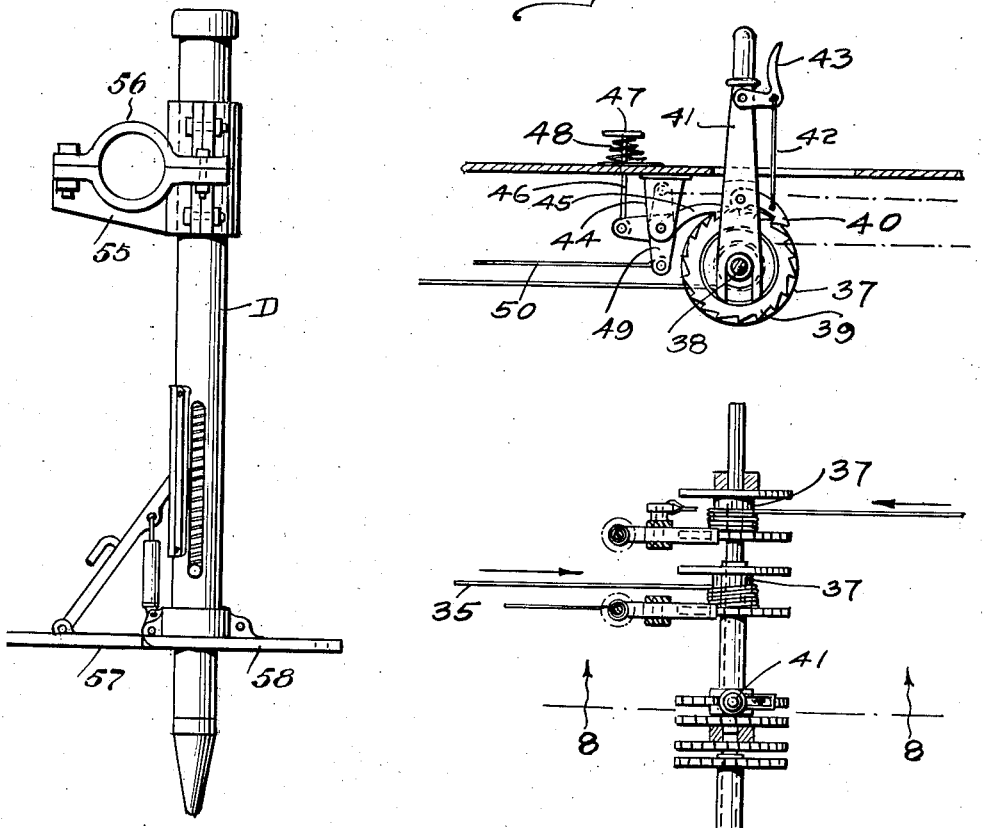
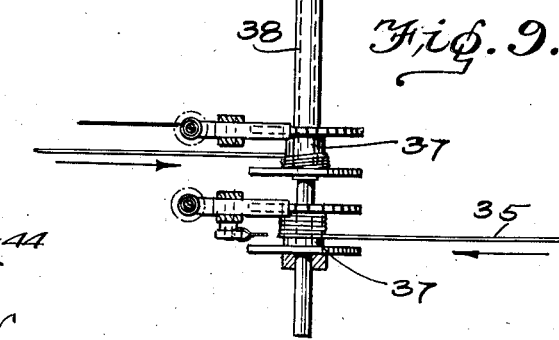
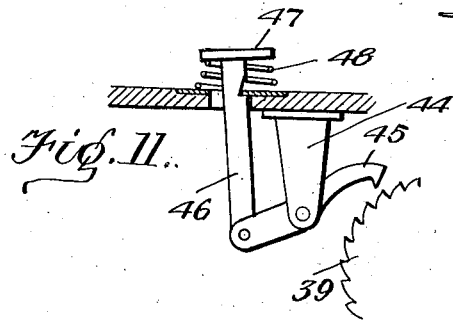

UNITED STATES PATENT OFFICE.

ARTHUR E. BURNSIDE, OF SOUTH JACKSONVILLE, FLORIDA.

AUTOMOBILE-JACK.

1,392,297. Specification of Letters Patent. Patented Oct. 4, 1921.

Application filed September 27, 1920. Serial No. 412,926.

*To all whom it may concern:*

Be it known that I, ARTHUR E. BURNSIDE, a citizen of the United States, residing at South Jacksonville, in the county of Duval and State of Florida, have invented new and useful Improvements in Automobile-Jacks, of which the following is a specification.

This invention relates to jacks and has for its object the provision of a jack structure associated with each end of each axle of an automobile and permanently associated with the automobile whereby the operator may, without leaving his seat, cause any one of the wheels to be elevated a sufficient distance to permit tire or other repairs.

An important object is the provision of a jack structure of this character in which the jacks are normally maintained in inoperative position, the jack members being connected by flexible members with an operating lever adjacent the driver's seat whereby any one may be swung into engagement with the ground or other surface so that when the automobile is driven a slight distance this jack member will rock upwardly and thereby elevate the end of the axle with which it is associated.

A further object is the provision of a device of this character which is so constructed that when the operator pulls upon the locking pawl to release the same the vehicle will descend to normal position and the operated jack returned to its inactive position.

An additional object is the provision of a device of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the chassis of an automobile showing my jack structure associated therewith and in normal or inactive position.

Fig. 2 is a plan view of the chassis.

Fig. 3 is a side elevation of one end of the chassis showing a jack member in operative position ready to elevate one end of the axle.

Fig. 4 is a similar view showing the end of axle elevated,

Fig. 5 is a longitudinal sectional view through one of the jack members, the hinged portion of the base plate being shown in normal position by full lines and in swung position by dotted lines, Fig. 6 is a cross sectional view taken on the line 6—6 of Fig. 5 and showing a plan view of the base plate, Fig. 7 is a detail sectional view on the line 7—7 of Fig. 5, Fig. 8 is an enlarged detail sectional view of the operating lever for returning the mechanism to inoperative position, Fig. 9 is a plan view of the mechanism referred to in Fig. 8, and Fig. 10 is an elevation of a modified form of jack member.

Fig. 11 is a sectional view of the foot operated releasing device.

Referring more particularly to the drawings, the letter A designates the side bars of the chassis of an automobile, B designates the front axle, and C designates the rear axle housing.

In carrying out my invention I provide a jack structure D at each end of the front axle and each end of the rear axle housing. The structure of all the jack members is the same so that a description of one will suffice. Each jack member includes a clamping member 10 formed of separable sections 11 and 12 detachably connected and provided with any suitable means for clamping engagement upon the front axle or rear axle housing, as the case may be. The lowermost section 12 is formed on a cap 13 which is threaded upon the upper end of a tubular casing 14 which carries at its lower end a rectangular base plate 15 which has one end portion 16 hingedly connected, as shown at 17, at a point spaced slightly from the end of the casing. The plate 15 is preferably threaded upon the lower end of the casing 14 and it will be observed that the length of the casing should be somewhat more than the distance from the center of the axle or spindle to the outside of the tire of the wheel to be elevated.

Slidably disposed within the lower end of the casing 14 is a hollow post 18 which has its lower end pointed, as shown at 19, and which has threaded within its upper end a plug or block 20 with which is connected one end of a coil spring 21 disposed within the casing and having its upper end connected with the cap 13. The block 20 carries a pin 20ª slidable within a slot 20ᵇ in the casing 14 whereby to limit the movement of the block. At one side, that toward the hinge 17, the casing 14 is provided with openings 22 and 23 at the sides of which are located guides 24.

At the free edge of the hinged portion of the base plate 15, is located an eye 25 with which is pivotally connected one end of a brace rod 26 which has its upper end slidable between the guides 24 and normally engaged within the opening 23. Pivotally connected with the base plate 15 adjacent the casing 14 is a tubular housing 27 within which is slidable a rod 28 pivotally connected with the brace rod 26 and carrying a washer 29 against which engages one end of a coil spring 30 which has its other end engaging against the top of the housing 27 which is closed except for a central opening permitting the passage of the rod 28. The purpose of this structure is to hold the brace rod 26 toward the casing 14 with the free end of the brace rod bearing thereagainst. The free end of this brace rod is formed with an overhanging lip 31 adapted to engage over the edge of the opening or slot 22. Secured upon the brace rod 26 is a hook 32 for a purpose to be described.

Carried by the base plate 15 at the opposite side of the casing 14 is an eye 33 with which is connected one end of a turn-buckle 34 which has its other end connected with a cable 35 trained over a guide pulley 36 secured upon the side bar A of the chassis. The cables from the rear jack members extend forwardly and those from the front jacks extend rearwardly and each cable is trained about a winding drum 37 rotatable upon a fixed shaft 38 secured transversely of the frame bars A. Each drum has associated therewith a ratchet 39 engaged by a pawl 40 carried by a lever 41 rockable upon the shaft 38. Each pawl 40 is connected by a link 42 with a grip 43 whereby the pawl may be moved out of engagement with the ratchet 39. Pivoted upon a bracket 44 adjacent each ratchet is a detent pawl 45 engaging the ratchet and having a link 46 connected therewith and carrying a head 47 depressible by the foot of the operator whereby to release the pawl 45. A coil spring 48 engages the head 47 for holding the pawl 45 in engagement with the ratchet. Each pawl 45 carries an arm 49 connected by a cable 50 with a spring-pressed latch 51 disposed beneath the frame at each jack member and engageable within a hole 52 of the associated jack whereby to hold the latter elevated.

All of the jack members being held with the holes 52 engaged upon the latches 51 in inoperative position, when it is desired to jack up any wheel, the operator releases the pawls 40 by squeezing the grip 43 and depresses the proper pedal 47 to release the pawl 45 from engagement with the ratchet and to withdraw the latch 51 from the holes 52 in the base of the jack to be operated, whereupon the desired jack member will drop into the position shown in Fig. 3, the cable 35 unwinding from the associated drum 37. The car is then driven either forwardly or rearwardly, depending upon whether a rear or a front jack is lowered, whereupon the jack member will rock upon the point 19 as a fulcrum until the casing 14 is in vertical position, it being of course necessary that the car be driven with sufficient speed to give it the necessary momentum. As the jack member is thus rocked the post 18 will slide upwardly within the casing 14 against the resistance of the spring 21 and as the upper end of the post 18 engages the free end of the brace rod 26 extending into the slot 22, this free end of the brace rod will be forced outwardly of the slot whereupon the tension of the spring 30 will pull the brace rod 26 downwardly between the guides 24 until the free end engages within the notch 23, at which time the hinged portion 16 of the base plate will aline with and form a continuation of the remainder of the base plate to serve as a supporting foot for holding the jack in vertical position and consequently holding the end of the axle elevated, as shown in Fig. 4. This action of the brace rod 26 and hinged portion 16 of the base occurs before this hinged portion strikes the ground or other surface.

When it is desired to lower the axle to normal position, the operator pulls upon the hook 32 of the jack in operation to disengage the end of the brace rod 26 from the notch 23 whereupon there will be nothing to hold the hinged portion 16 of the base plate rigid and the weight consequently not being sustained at that side of the casing 14, the jack will naturally swing to the other side, the vehicle descending until the previously elevated wheel thereof engages the ground. As the jack thus swings the hinged portion 16 of the base will be forced upwardly against the resistance of the spring 30 until the free end of the brace rod engages within the slot 22. By reciprocating the lever 41 to rotate the ratchet 39 and drum 37, the cable will be rewound upon the drum and the jack be consequently elevated into initial position with the hole 52 in the base thereof reëngaging the latch 51.

Referring to the modified form shown in Fig. 10, instead of employing the cap 13 with the clamping members carried thereby I make use of a member 55 formed as a casting and disposed at the side of the casing 14 above the hinged portion of the base plate. The upper end of this casting 55 is formed concaved and has associated therewith a clamping member 56 adapted to engage over the axle or axle housing. The casting 55 is provided with an opening within which the casing 14 is secured by any desired means. By providing means for adjusting the position of the casting 55 upon the casing 14, it will be seen that the device may be adjusted for use upon cars having different sizes of wheels. In this form the hinged portion 57 of the base 58 must be made longer than the hinged portion 16 of the base in the previously described form as the center of gravity is at one side of the casing. In other respects this form is the same as the previously described form and it is believed that further explanation is unnecessary.

From the foregoing description and a study of the drawings it will be apparent that I have thus provided a very easily operated jack structure adapted for permanent association with an automobile and operable from the driver's seat whereby any wheel may be jacked up and let down again.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. An automobile jack mechanism for motor vehicles comprising a jack member permanently associated with each end of the front axle and rear axle housing, said jack members being pivotally mounted therewith to be capable of swinging movement in a vertical plane, latch members connected with said jack members whereby to maintain them normally elevated and in substantially horizontal position, a flexible member connected with each jack member and leading over suitable guides to a point adjacent the driver's seat, lever operated mechanism connected with said flexible members whereby to swing a selected jack member upwardly into engagement with said latch members, and means for releasing said lever mechanism to permit a selected jack member to swing downwardly so that when the vehicle is driven the jack member thus swung will be rocked into vertical position beneath the axle or axle housing, each jack member including a support, a base plate having a portion thereof hinged, and a brace for holding said hinged portion against movement, and means connected with said brace member whereby upon a pull upon the latter said brace will be released to permit said hinged portion to swing to permit the jack member to swing and allow the axle or axle housing to descend.

2. A jack mechanism comprising a jack member associated with the end of an axle or axle housing and including a base plate having a portion thereof hinged, a cylindrical casing carried by the base plate and provided with clamping members revolubly engaging the axle or axle housing, the casing being provided with slots, a spring within said casing, a post slidable within said casing and engaging the spring, said post projecting beyond said plate, a brace rod pivotally connected with the hinged portion of the base plate and normally engaging within one of said slots, means for permitting swinging of said jack member into engagement with the ground or other surface whereupon when the vehicle is driven the jack member will rock into vertical position for elevating the axle or axle housing, said rocking movement resulting in movement of said post into the casing and into engagement with the end of the brace rod extending into the slot, and a spring connected with the base and brace rod whereby to cause engagement of the end of the latter within the other slot to hold the hinged portion of the base rigid.

3. A jack mechanism for motor vehicles comprising a jack member permanently associated with each end of the front axle and rear axle housing and pivotally mounted, latch members engageable with said jack members whereby to maintain the latter normally elevated and in substantially horizontal position, a flexible member connected with each jack member and leading over suitable guides to a point adjacent the driver's seat, means connected with said flexible members whereby to swing a selected jack member upwardly into engagement with its latch member, and means for releasing said lever mechanism to permit a selected jack member to swing downwardly so that when the vehicle is driven the jack members thus swung will be rocked into vertical position beneath the axle or axle housing, each jack member including a support, a base plate having a portion thereof hinged, and a spring pressed brace connected with the hinged portion whereby to normally hold the latter against movement, an outwardly spring pressed projecting member normally disposed within the support, a brace connected with the base portion and detachably engageable with said last named portion whereby to hold the latter in retracted position, and means whereby upon downward swinging of a jack member the brace member will be released to permit projection of said last named member.

4. A jack mechanism for motor vehicles comprising a jack member permanently associated with each end of the front axle and rear axle housing, said jack members being pivotally mounted whereby to be capable of swinging movement in a vertical plane, latch members connected with said jack members whereby to maintain the latter normally elevated and in substantially horizontal position, a flexible member connected with each jack member and leading over suitable guides to a point adjacent the driver's seat, lever operated mechanism connected with said flexible members whereby to swing a selected jack member upwardly from a downwardly swung position into engagement with said latch members, and means for releasing said lever mechanism to permit a selected jack member to swing downwardly so that when the vehicle is driven the jack member thus swung will be rocked into vertical position beneath the axle or axle housing, each jack member including a support, a base plate having a portion thereof hinged, a brace for holding said hinged portion normally against movement, each jack member further including suitable guides to a point adjacent the driver's seat, lever operated mechanism connected with said flexible members whereby to swing a selected jack member upwardly into engagement with said latch members, and means for releasing said lever mechanism to permit a selected jack member to swing downwardly so that when the vehicle is driven the jack member thus swung will be rocked into vertical position beneath the axle or axle housing.

In testimony whereof I affix my signature.

ARTHUR E. BURNSIDE.